US007124404B1

(12) United States Patent
Bebout et al.

(10) Patent No.: US 7,124,404 B1
(45) Date of Patent: Oct. 17, 2006

(54) METHOD AND SYSTEM FOR DEBUGGING MULTIPROCESSOR SYSTEMS

(75) Inventors: Don W. Bebout, Fountain Valley, CA (US); Ulrich Bortfeld, Fremont, CA (US); Wade D. Guthrie, Laguna Beach, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 658 days.

(21) Appl. No.: 10/153,576

(22) Filed: May 21, 2002

Related U.S. Application Data (63) Continuation-in-part of application No. 09/571,924, filed on May 16, 2000, now Pat. No. 6,718,294.

(51) Int. Cl.
    *G06F 9/44* (2006.01)
(52) U.S. Cl. .................................... 717/127; 717/131
(58) Field of Classification Search ......... 717/124–135
    See application file for complete search history.

(56) References Cited

U.S. PATENT DOCUMENTS

| | | | | |
|---|---|---|---|---|
| 5,602,729 A | * | 2/1997 | Krueger et al. | 717/124 |
| 6,126,328 A | * | 10/2000 | Mallory et al. | 717/114 |
| 6,425,122 B1 | * | 7/2002 | Klingman | 717/124 |
| 6,718,294 B1 | * | 4/2004 | Bortfeld | 703/20 |
| 6,848,097 B1 | * | 1/2005 | Alverson et al. | 717/124 |

OTHER PUBLICATIONS

Microsoft Press Computer Dictionary, Third Edition. 1997. pp. 406, 387, 82, 165.*
Parson et al., "Extension Language Automation of Embedded System Debugging, and Demo: Eploiting Extension Language Capabilities in Hardware/Software Co-design and Co-verification", Bell Laboratories, Lucent Technologies, p. 1-19, Aug. 2000.*
Wong, "Microprocessor Debugging: It's Not Just Threads Anymore", Electronic Design, ID No. 3846, 3 pages, Jul. 2001.*

* cited by examiner

*Primary Examiner*—Ted T. Vo
(74) *Attorney, Agent, or Firm*—Farjami & Farjami LLP

(57) ABSTRACT

Debugging a multiprocessor system utilizing at least two debuggers is disclosed. A user command is issued through a first debugger to a first processor in the multiprocessor system. The user command can be converted to a debugger RPC command by a first proxy module associated with the first debugger. The user command can be intercepted by a scheduler. A second processor in the multiprocessor system is then informed, for example by the scheduler, of the issuance of the user command. The user command is executed by both the first and second processors and both the first and second debuggers can then be informed by means of processor RPC commands of the execution of the user command. The processor RPC commands can be converted to callback commands by respective first and second proxy modules associated with the first and second processors when being sent to the first and second debuggers.

20 Claims, 5 Drawing Sheets

METHOD AND SYSTEM FOR DEBUGGING MULTIPROCESSOR SYSTEMS

This application is a continuation in part of, and claims benefit of the filing date of, and hereby incorporates fully be reference, the parent application entitled "System and Method for Synchronized Control of System Simulators with Multiple Processor Cores," Ser. No. 09/571,924 filed May 16, 2000 now U.S. Pat. No. 6,718,294 and assigned to the assignee of the present application.

BACKGROUND OF THE INVENTION

1. Field of the Invention

The present invention is generally in the field of debuggers for processors and, more particularly, in the field of debugging multiprocessor systems.

2. Background Art

Software for embedded systems is conventionally developed using a single micro controller or a digital signal processor (DSP) and either an emulation or simulation module to which a debugger is attached. A debugger is a tool that aids a programmer or developer in locating and correcting errors in the system. In the case of a simulation module, the debugging system and the debugger are both implemented in software.

When debugging software in a multiprocessor environment using multiple debuggers, the state of each individual processor is displayed independently in each debugger. However, multiprocessor systems typically share system resources such as shared memory. When a user changes the state of a "shared system resource," by utilizing a debugger, the other debuggers are not informed of the change to the system state. Furthermore, many multiprocessor systems now exist which contain a centralized control structure to allow the execution state of all the processors in the system to be started and stopped synchronously. This is true of most system simulation environments that utilize a centralized clocking scheme and a centralized debug controller. In these environments, any of the attached software debuggers can modify the execution state of all of the processors. When this modification occurs, the other debuggers are no longer coordinated with the system to which they are attached.

In the past, hardware/software developers typically limited themselves to debugging one processor at a time to limit the source of state changes in the system. When the need to simultaneously debug multiple processors arose, the hardware/software developers were forced to manually re-synchronize the debuggers. An alternative approach was to create a single debugger capable of debugging multiple processors. In this environment all state changes come from a single source. Unfortunately, this type of debugger is more difficult to develop and must be modified if a new type of processor is added to the environment.

Figure 1:
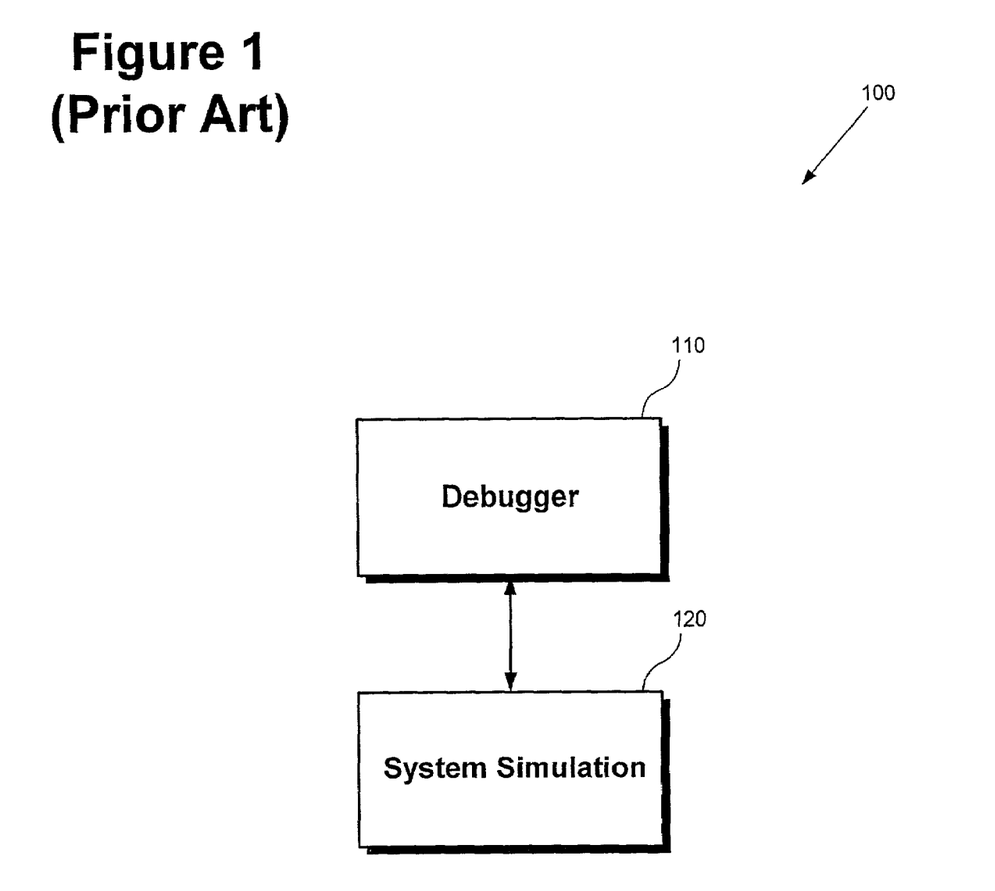
FIG. 1 illustrates an exemplary conventional single processor simulation environment.

FIG. 1 illustrates a conventional exemplary single-processor system simulation, i.e. debugging system 100. In the present application, the entity upon which a debugger acts will be referred to as a "target" within a "system simulation." A system simulation may include, for example, several targets, a scheduler, and a shared system resource such as a shared memory. Furthermore, a target may contain a central processing unit (CPU), among other elements. As shown in FIG. 1, debugging system 100 includes a debugger, i.e. debugger 110, which communicates with a processor model, i.e. system simulation 120. Debugger 110 is used to control and display the state of system simulation 120.

Figure 2:
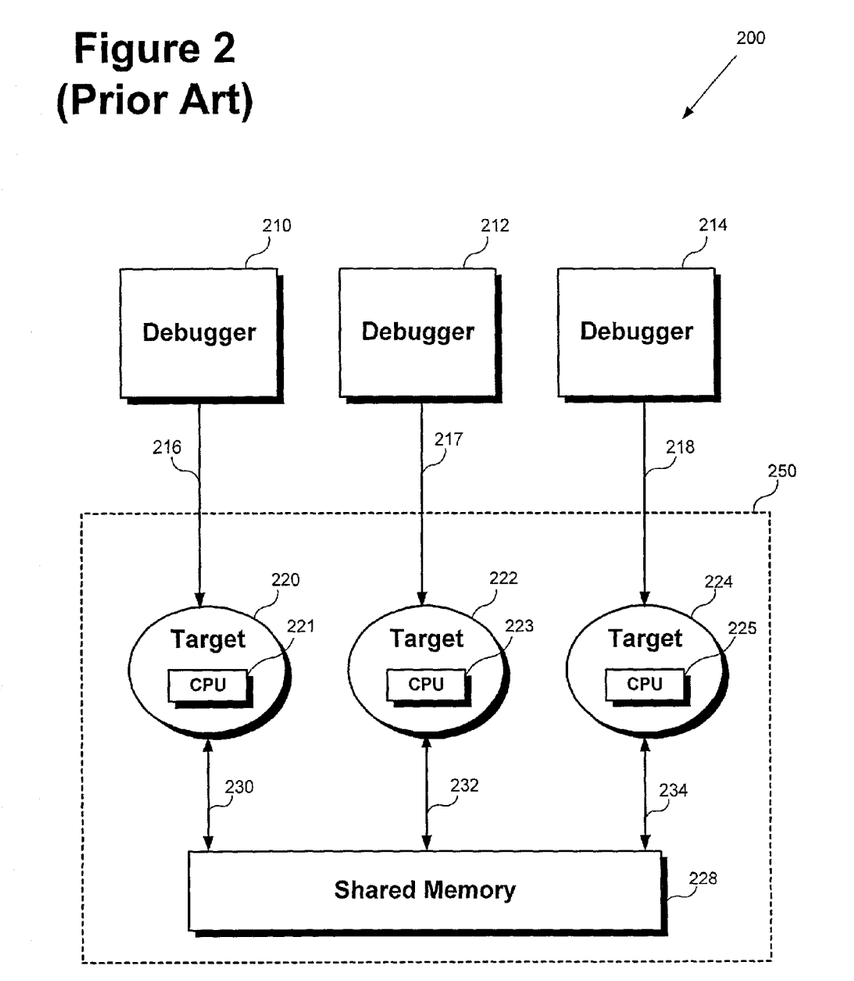
FIG. 2 illustrates an exemplary conventional multiprocessor simulation environment.

Many of today's embedded software applications are complex and cannot be properly supported by a single microprocessor system. FIG. 2 illustrates an exemplary conventional multiprocessor system simulation, i.e. debugging system 200. Debugging system 200 includes debuggers 210, 212, and 214, a shared system resource such as shared memory 228, and targets 220, 222, and 224. Targets 220, 222, and 224 further comprise CPUs 221, 223, and 225, respectively. Information, e.g. a "stop command," can be communicated from debuggers 210, 212, and 214 to targets 220, 222, and 224, respectively, as represented pictorially by "communication lines" 216, 217, and 218, respectively. Furthermore, shared memory 228 can have two-way communication with targets 220, 222, and 224, as represented pictorially by two-way "communication lines" 230, 232, and 234, respectively. As an example, debugger 210 may issue a command to CPU 221 in target 220, via communication line 216. A problem that arises in conventional multiprocessor debugging systems, such as debugging system 200, is that the debuggers are not aware of changes made to the system state by other debuggers. This problem can be illustrated by the following example.

As mentioned above, debugging system 200 includes three CPUs: CPU 221, CPU 223, and CPU 225, which are run in debug mode using debugger 210, debugger 212, and debugger 214, respectively. Moreover, CPUs 221, 223, and 225 may share system resources, such as shared memory 228. Thus, debugger 210 may issue a command to CPU 221 which will in turn cause a change in the state of shared memory 228 within system simulation 250. When debugger 210 changes the state of shared memory 228, debugger 212 and debugger 214 are not informed of this change and are thus not updated to reflect the current state of shared memory 228. In effect, each debugger in debugging system 200 acts as if it is the only entity that may change the state of a shared system resource, and that its commands are necessarily executed, without accounting for the actions of other debuggers. Due to this lack of coordination between the debuggers and the system simulation, debuggers 212 and 214 may initiate improper commands, or may fail to initiate necessary commands.

Thus there is a need in the art for coordination of multiple debuggers in a multiprocessor simulation environment.

SUMMARY OF THE INVENTION

The present invention is directed to method and system for debugging multiprocessor systems. The present invention overcomes the need in the art for coordination of multiple debuggers in a multiprocessor simulation environment.

In one embodiment, the invention is a method for debugging a multiprocessor system utilizing at least two debuggers. A user command is issued through a first debugger to a first processor in the multiprocessor system. The user command can be, for example, a run command a stop command, or a step command. The user command can be converted to a debugger RPC command by, for example, a first proxy module associated with the first debugger. The user command can be intercepted by a scheduler. A second processor in the multiprocessor system is then informed, for example by the scheduler, of the issuance of the user command.

The user command, for example, the stop, step, or run command, is executed by both the first and second processors and both the first and second debuggers can then be informed by means of processor RPC commands of the execution of the user command. The processor RPC commands can be converted to, for example, callback commands by respective first and second proxy modules associated with the first and second processors when being sent to the first and second debuggers. In other embodiments, the present invention is a system capable of, or a computer readable medium having a computer program capable of, carrying out the invention's method.

In a manner described below, the present invention results in accurate, efficient, and thorough simulation of multiprocessor systems utilizing a variety of different debuggers. Other features and advantages of the present invention will become more readily apparent to those of ordinary skill in the art after reviewing the following detailed description and accompanying drawings.

DETAILED DESCRIPTION OF THE INVENTION

The present invention is directed to method and system for debugging multiprocessor systems. The following description contains specific information pertaining to implementation of specific embodiments of the invention. However, one skilled in the art will recognize that the present invention may be implemented in a manner different from that specifically discussed in the present application. Moreover, some of the specific details, which are within the knowledge of a person of ordinary skill in the art, are not discussed to avoid obscuring the present invention.

The drawings in the present application and their accompanying detailed description are directed to merely exemplary embodiments of the invention. To maintain brevity, other embodiments of the invention which use the principles of the present invention are not specifically described in the present application and are not specifically illustrated by the present drawings.

Figure 3:
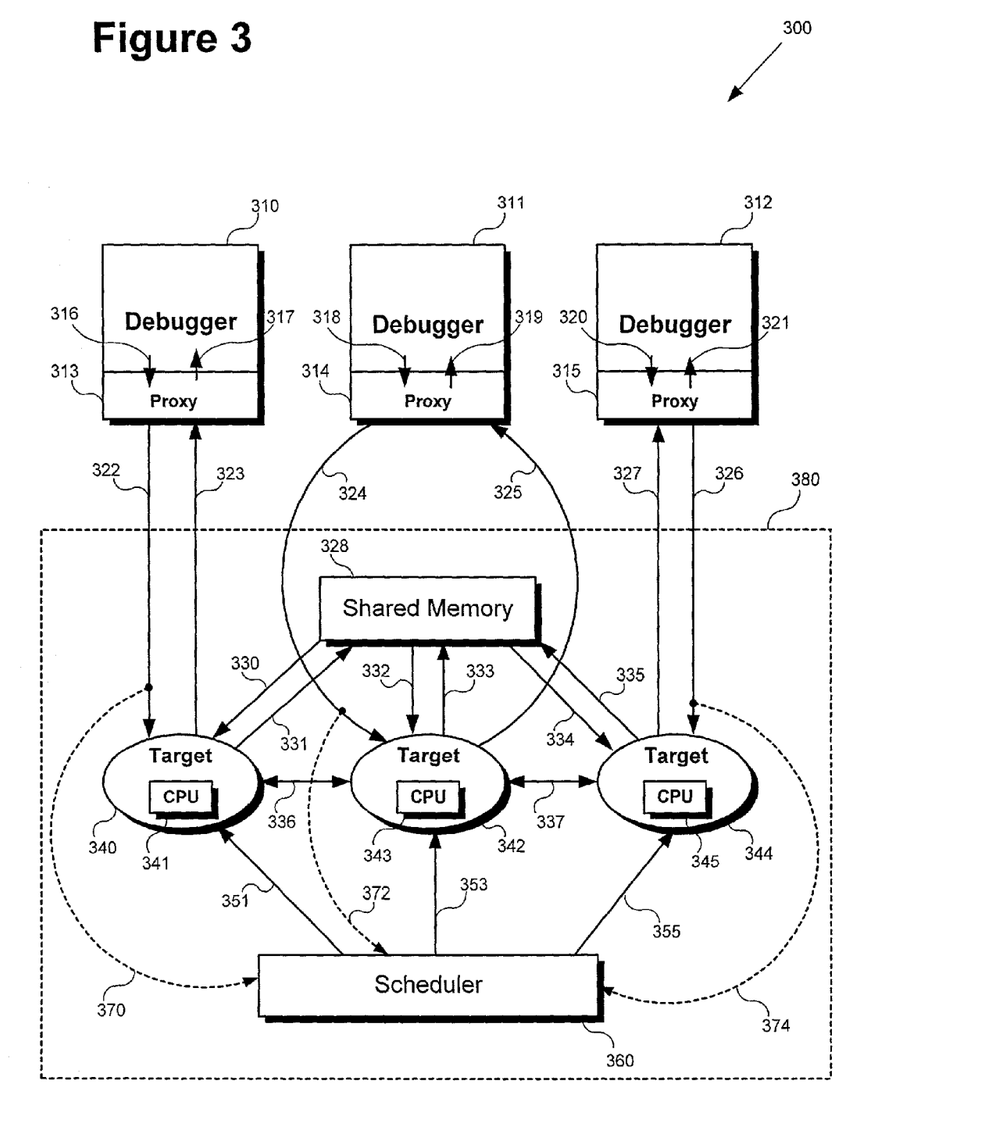
FIG. 3 illustrates an exemplary embodiment of the present invention's debugging system.

FIG. 3 illustrates an exemplary embodiment of the present invention's debugging system 300. Debugging system 300 comprises three debuggers, i.e. debugger 310, debugger 311, and debugger 312, and system simulation 380. Furthermore, debuggers 310, 311, and 312, may each include a graphic user interface (GUI). Debuggers 310, 311, and 312, may be utilized to analyze and modify the contents of a shared system resource, e.g. shared memory 328. It should be noted that although shared memory 328 is used herein as one particular example of a shared system resource in debugging system 300, shared memory 328 may be replaced by a differentshared system resource, for example, an I/O port, a DMA controller, a Viterbi decoder, a hardware echo canceler, or in general any system resoucrce shared by two or more targets. System simulation 380 represents a multiprocessor system that is being simulated, and comprises shared memory 328, scheduler 360, and targets 340, 342, and 344. Target 340 includes CPU 341, target 342 includes CPU 343, and target 344 includes CPU 345.

As an example, system simulation 380 may be a simulation of a cable modem chip. More specifically, system simulation 380 may be a simulation of a cable modem chip that contains a shared memory unit and operates with three CPUs. To simulate an exemplary use of a cable modem chip, system simulation 380 may be performed by having CPUs 341, 343, and 345, each execute separate applications. By way of an example, CPU 341 may be running an operating system, CPU 343 may be running a digital signal processor (DSP) algorithm, and CPU 345 may be running an echo cancellation routine.

Before entering or leaving debugger 310, 311, or 312, information first passes through proxy modules 313, 314, and 315, respectively. Proxy modules 313, 314, and 315, are part of a shared library that is dynamically linked to debuggers 310, 311, and 312, respectively. "Communication lines" 316 and 317, 318 and 319, and 320 and 321, represent transmission of information between debuggers 310, 311, and 312, and proxy modules 313, 314, and 315, respectively.

For example, information from debugger 310 may be communicated to CPU 341 in target 340 by first going through proxy module 313, as represented by line 316. From proxy module 313, information is communicated to target 340, as represented by line 322. Thus, information flow from debugger 310 to CPU 341 in target 340 is indicated by lines 316 and 322. Conversely, information can be transmitted from target 340 to proxy 313 and debugger 310 in a manner represented by lines 323 and 317, respectively. It is noted that lines 323, 325, and 327, may also represent communication of "callback commands" from system simulation 380 back to debuggers 310, 311, and 312, respectively. As such, lines 323, 325, and 327 are also referred to as "callback communication lines" in the present application.

Shared memory 328 can communicate with target 340 as represented by "communication lines" 330 and 331, and with target 342 as represented by "communication lines" 332 and 333, and further with target 344 as represented by "communication lines" 334 and 335. Scheduler 360 can communicate with target 340 as represented by "communication line" 351, and with target 342 as represented by "communication line" 353, and further with target 344 as represented by "communication line" 355. Furthermore, any information transmitted to targets 340, 342, and 344, from debuggers 310, 311, and 312, respectively, and through communication lines 322, 324, and 326, may be intercepted by scheduler 360. For example, information transmitted to target 340, through communication line 322, may be intercepted by scheduler 360 as represented by "communication line" 370. Information transmitted to target 342, through communication line 324, may be intercepted by scheduler 360 as represented by "communication line" 372. Similarly, information transmitted to target 344, through communication line 326, may be intercepted by scheduler 360 as represented by "communication line" 374. It is again noted that a "communication line," represented by either a solid or dashed line in the present application, is merely a pictorial reference to a means for transmission or exchange of information from one module in debugging system 300 to another module therein. Thus, it is appreciated that communications through a "communication line" might occur entirely in software, in which case a "communication line" does not refer to a physical hardware interconnect line nor does it refer to signals transmitted therethrough.

A command, for example a "run command", "stop command", "step command", or "modify memory command", sent from debugger 310 to target 340, can be intercepted by scheduler 360 via communication line 370, as described above. Similarly, commands sent from debuggers 311 and 312 can be intercepted by scheduler 360 via communications lines 372 and 374, respectively. In turn, system simulation 380 can send callback commands to debuggers 310, 311, and 312, via callback communication lines 323, 325 and 327, respectively, to notify some or all of the debuggers of the change in the state of one or more CPUs 341, 343, and 345. The "run command", "stop command", and "step command" are examples of commands that can be issued from each respective debugger to directly modify the state of its corresponding CPU, e.g. CPU 341, CPU 343, or CPU 345. Furthermore, as discussed in other parts of the present application, a modification in the state of one CPU in response to a command, for example, in response to a run command, a stop command, or a step command, may result in the modification of the state of other CPUs in the system through the operation of scheduler 360. A CPU in the "run" state may be executing instructions from its programmed memory. A CPU in the "stop" state, however, is idle and is not executing instructions out of its programmed memory, but instead may be continuously receiving "no operation" instructions. The run state may further comprise a number of sub-states of the CPU, e.g. a "fetch state" or a "decode state." Moreover, CPUs 341, 343, and 345, may each have a number of "power-down" states in which portions of the CPU may be powered down, e.g. the execution units or the fetch units. Further, CPUs 341, 343, and 345, may each have a "power-off" state.

Figure 4:
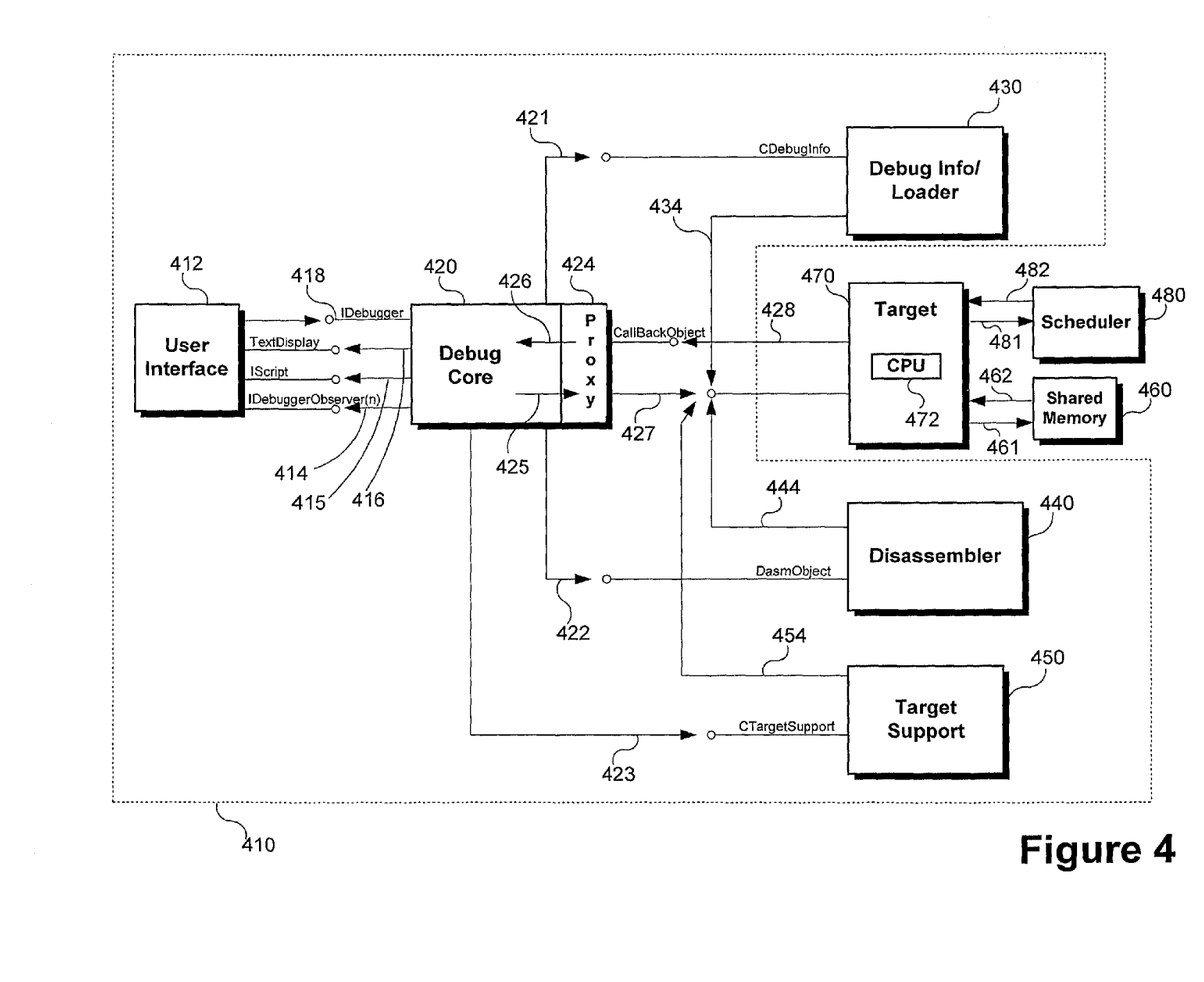
FIG. 4 illustrates an embodiment of an exemplary debugger within the invention's debugging system.

An exemplary embodiment of debugger 310 in FIG. 3 is shown in detail as debugger 410 in FIG. 4. FIG. 4 comprises debugger 410, shared memory 460, target 470, and scheduler 480, where debugger 410 can be used to debug programs that are running in target 470. Debugger 410 corresponds to debugger 310 in FIG. 3, shared memory 460 corresponds to shared memory 328, target 470 corresponds to target 340 in FIG. 3, and scheduler 480 corresponds to scheduler 360. Furthermore, communication lines 425 and 426 correspond to communication lines 316 and 317, respectively, and communication lines 427 and 428 correspond to communication lines 322 and 323, respectively. It is noted that other debuggers and targets, i.e. debuggers 311 and 312, and targets 342 and 344, along with their associated connections to shared memory 328 and scheduler 360, are not shown in FIG. 4.

As shown in FIG. 4, debugger 410 comprises user interface 412, debug core 420, debug info/loader 430, disassembler 440, and target support 450. Although proxy module 424 is shown as part of debugger 410, proxy module 424 is part of a shared library that is dynamically linked to debugger 410. Target 470 comprises a single CPU, i.e. CPU 472. Target 470 communicates with shared memory 460 via communication lines 461 and 462, and with scheduler 480 via communication lines 481 and 482.

In FIG. 4, user interface 412 may include access to multiple interfaces, e.g. "IDebuggerObserver" via communication line 414, "IScript" via communication line 415, and "TextDisplay" via communication line 416. Debug core 420 is a dynamically loaded library (DLL) that might include access to two interfaces: "IDebugger" via communication line 418 and "CallBackObject" via communication line 428. "IDebugger" and "CallBackObject" may be C++ interfaces implemented as a single class using multiple inheritances. In the present embodiment, debug core 420 is the non-GUI, CPU-independent portion of debugger 410, such that it is not target-specific and may be used with any type of target or CPU. Instead, debug core 420 utilizes a set of additional support components, such as disassembler 440, target support 450, and debug info/loader 430, to customize the functionality for a specific target, i.e. target 470.

As stated above, in the exemplary embodiment of FIG. 4, the additional support components within debugger 410 comprise debug info/loader 430, disassembler 440, and target support 450, each of which is implemented as a DLL that includes access to programming interfaces based on the type of target(s) or CPU(s) in the system simulation. Debug info/loader 430, disassembler 440, and target support 450, may each include a single C++ interface, e.g. debug info/loader 430 includes interface "CDebugInfo" via communication line 421, disassembler 440 includes interface "DasmObject" via communication line 422, and target support 450 includes interface "CTargetSupport" via communication line 423. As an example, CPU 472 may be an Advanced RISC-based Machine (ARM) processor that utilizes debug info/loader 430 for file formatting, disassembler 440 for ARM instruction set information, and target support 450 for ARM 'C' compiler information.

Communication lines 421, 422, and 423 facilitate communication from debug core 420 to debug info/loader 430, disassembler 440, and target support 450, respectively. Communication lines 434, 444, and 454, facilitate communication from debug info/loader 430, disassembler 440, and target support 450, respectively, to target 470. Referring to debug core 420, communication lines 425 and 427 facilitate communication with target 470, and communication lines 428 and 426 facilitate communication from target 470 to debug core 420. Target 470 communicates with shared memory 460 via communication lines 461 and 462, and with scheduler 480 via communication lines 481 and 482.

Figure 5:
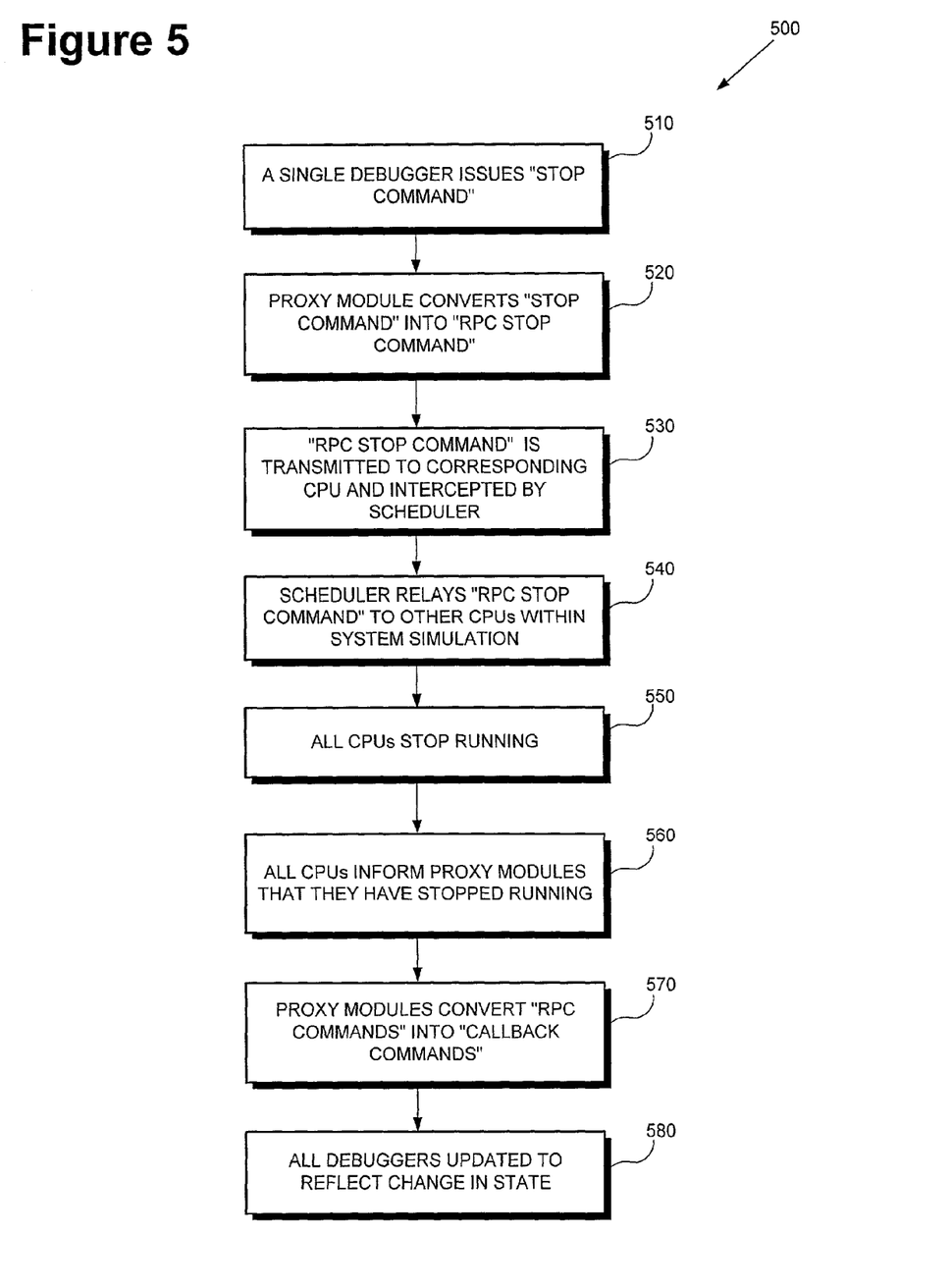
FIG. 5 is a flowchart corresponding to an exemplary process within the invention's debugging system.

Referring to FIG. 5, flowchart 500 outlines an exemplary process within debugging system 300. Beginning with the assumption that debugging system 300 is currently in the "run" state, for example, a user may wish to issue a "user command" to place debugging system 300 in the "stop" state. In the stop state, a user is able to diagnose the status of the system and check if the system is running properly. For example, a user may want to stop the system in order to check the current stack and view the contents of various registers, or to see if instructions are being executed as expected. Using debuggers 310, 311, and 312, a user may view the code pointed to by the current program counter, and view the original source code corresponding thereto.

Flowchart 500 relates to an exemplary process initiated by a single debugger, e.g. debugger 310, within debugging system 300. At step 510, debugger 310 issues a "stop command," which may occur at a pre-set breakpoint or at random, as determined by the user of debugger 310. The "stop command" is transmitted via communication line 316 to proxy module 313. At step 520, proxy module 313 receives the "stop command" and converts it to a "remote procedure call (RPC) stop command." In an exemplary embodiment, the present invention may utilize a remote procedure call (RPC) mechanism. The debuggers attach to the system simulation and use RPC commands to interrogate and modify either the system simulation or the state of an individual CPU.

At step 530, the "RPC stop command" is transmitted to CPU 341 in target 340, via communication line 322, and intercepted by scheduler 360 via communication line 370. At step 540, scheduler 360 relays the "RPC stop command" to CPU 343 and CPU 345, via communication lines 353 and 355, respectively. At step 550, all the CPU's, i.e. CPUs 341, 343, and 345, stop running. In an alternative embodiment, commands to the CPUs in debugging system 300 may be issued independently, such that only selected CPUs may be commanded to stop running at step 540. For example, at step 540, scheduler 360 may relay the "RPC stop command" to CPU 343, but not to CPU 345.

Continuing with step 560, CPUs 341, 343, and 345 inform proxy modules 313, 314, and 315, that CPUs 341, 343, and 345, have stopped running. At step 570, proxy modules 313, 314, and 315, each convert their respective "RPC commands" into "callback commands" that can be recognized by debuggers 310, 311, and 312, respectively. The "callback commands" are sent via communication lines 317, 319, and 321, to debuggers 310, 311, and 312, respectively. The "callback commands" update the debuggers to reflect the current state of the CPUs in system simulation 380. Finally, at step 580, debuggers 310, 311, and 312 are all simultaneously updated to reflect the change in state within system simulation 380, i.e. the change in state of CPUs 341, 343, and 345. As another example, a "modify memory command" may be issued from debugger 310 to target 340, via communication lines 316 and 322, and then to shared memory 328 via communication line 331. Shared memory 328 then notifies all targets, i.e. targets 340, 342, and 344, which in turn notify their respective debuggers via communication lines 323, 325, and 327.

In the exemplary embodiment of the present invention shown in FIG. 3, i.e. debugging system 300, a user can independently control a number of different targets within a system simulation while maintaining coordination among the debuggers, a capability that is not provided by conventional debugging systems. In conventional debugging systems, a user can only debug one CPU at a time, and changes made in one CPU by a debugger are not relayed to the other debuggers. In other words, a user of a conventional debugging system cannot dynamically switch between checking or analyzing the state of various CPUs. A user must have the knowledge of how changes made in one debugger will affect the other debuggers in the system, and manually convey this information to the debuggers, or else the debuggers will not be coordinated with one another and the system simulation.

This conventional approach is both time-consuming and prone to errors and inaccuracies. The present invention overcomes these shortcomings by providing the debuggers with callback information in the form of "callback commands" from the system simulation, i.e. the information provided by callback communication lines 323, 325, and 327 in FIG. 3, and callback communication line 428 in FIG. 4. The aforementioned callback communication lines allow the debuggers to be simultaneously updated with new information regarding the system state.

For example, referring to the exemplary conventional debugging system 200 shown in FIG. 2, debugger 210 may be a DSP debugger and debugger 212 may be an ARM debugger. If a user of debugging system 200 transmits a communication from ARM debugger 212 to system simulation 250, the user would know that the information was sent but would have no knowledge on whether the information was perceived by DSP debugger 210. In order to obtain this knowledge, the user would have to shut down the system simulation, restart it, and then analyze the system from the perspective of DSP debugger 210. Thus, conventional debugging systems provide a user with a very limited view of the system simulation, i.e. a view from the perspective of one debugger at a time. In contrast, the present invention provides the user with a view of the entire system 11 simulation.

In the manner described above, the present invention allows the coordination of independent debuggers within a multiprocessor environment. Although each debugger is only concerned with one processor and not the entire system, system-level interactions are reflected in each debugger, thereby simplifying the development and use of the debuggers in simulating multiprocessor systems. Each user is free to implement as many or as few debuggers as necessary for a particular application. As such, the present invention results in accurate, efficient, and thorough simulation of multiprocessor systems utilizing a variety of different debuggers.

Thus, the invention provides method and system for debugging multiprocessor systems. Those of skill in the art would understand that information and signals may be represented using any of a variety of different technologies and techniques. For example, data, instructions, commands and information that may be referenced throughout the above description may be represented by voltages, currents, electromagnetic waves, magnetic fields or particles, optical fields or particles, or any combination thereof.

Those of skill would further appreciate that the various illustrative system blocks, logical blocks, modules, and algorithm or method steps described in connection with the embodiments disclosed herein may be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative system blocks, logical blocks, and modules described in connection with the embodiments disclosed herein may be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. The software module, also called a computer program in the present application, may contain a number of source code or object code segments and may reside in any computer readable medium such as a RAM memory, flash memory, ROM memory, EPROM memory, EEPROM memory, registers, hard disk, a removable disk, a CD-ROM, a DVD-ROM or any other form of computer readable medium known in the art. An exemplary computer readable medium is coupled to a processor, where the processor can read information from, and write information to, the computer readable medium. In the alternative, the computer readable medium may be integral to the processor. The processor and the computer readable medium may reside in an ASIC. In the alternative, the processor and the computer readable medium may reside as discrete components.

From the above description of the invention it is manifest that various techniques can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

Thus, method and system for debugging multiprocessor systems have been described.

The invention claimed is:

1. A method to debug a multiprocessor system comprising first and second debuggers, said method comprising steps of:
   issuing a user command from said first debugger to a first processor in said multiprocessor system;
   informing a second processor in said multiprocessor system regarding said user command;
   executing said user command by said first and second processors;
   coordinating said first debugger with said second debugger by calling back said first and second debuggers after execution of said user command by said first and second processors and by updating said first and second debuggers to reflect a change in a state of said first and second processors.

2. The method of claim 1 wherein said step of issuing said user command comprises a step of converting said user command to a debugger RPC command.

3. The method of claim 2 wherein said step of converting said user command to said debugger RPC command is performed by a proxy module associated with said first debugger.

4. The method of claim 1 further comprising a step of intercepting said user command by a scheduler prior to said informing step.

5. The method of claim 4 wherein said informing step comprises a step of relaying said user command by said scheduler to said second processor.

6. The method of claim 1 further comprising a step of said first and second processors issuing respective first and second processor RPC commands after said executing step.

7. The method of claim 6 wherein said step of calling back comprises a step of converting said respective first and second processor RPC commands to respective first and second callback commands.

8. The method of claim 7 wherein said step of converting said respective first and second processor RPC commands to said respective first and second callback commands is performed by first and second proxy modules associated respectively with said first and second debuggers.

9. The method of claim 1 wherein said user command is selected from the group consisting of a stop command, a run command, and a step command.

10. A debugging system comprising:
    first and second debuggers;
    first and second proxy modules being associated with respectively said first and second debuggers;
    first and second processors in communication with a shared resource;
    a scheduler in communication with said first and second processors;
    said first and second processors being configured to provide processor RPC commands to said first and second proxy modules, wherein said first and second proxy modules convert said processor RPC commands into callback commands for respectively said first and second debuggers, wherein said callback commands are used to coordinate said first and second debuggers by updating said first and second debuggers to reflect a change in a state of said first and second processors.

11. The debugging system of claim 10 wherein said first debugger issues a user command to said first processor.

12. The debugging system of claim 11 wherein said user command is converted to a debugger RPC command by said first proxy module.

13. The debugging system of claim 12 wherein said scheduler intercepts said user command issued by said first debugger.

14. The debugging system of claim 11 wherein said user command is selected from the group consisting of a stop command, a run command, and a step command.

15. The debugging system of claim 10 wherein said shared resource is a shared memory.

16. A computer readable medium embodying a computer program for debugging a multiprocessor system comprising first and second debuggers, said computer program comprising:
    a first code segment for issuing a user command from said first debugger to a first processor in said multiprocessor system;
    a second code segment for informing a second processor in said multiprocessor system regarding said user command;
    a third code segment for executing said user command by said first and second processors;
    a fourth code segment for calling back said first and second debuggers after execution of said user command by said first and second processors, wherein said callback commands are used to coordinate said first and second debuggers by updating said first and second debuggers to reflect a change in a state of said first and second processors.

17. The computer readable medium of claim 16 wherein said first code segment includes a code segment for converting said user command to a debugger RPC command.

18. The computer readable medium of claim 16 further comprising a fifth code segment for intercepting said user command by a scheduler prior to said informing of said second processor.

19. The computer readable medium of claim 18 wherein said second code segment includes a code segment for relaying said user command by said scheduler to said second processor.

20. The computer readable medium of claim 16 wherein said computer readable medium is selected from the group consisting of a CD-ROM and a DVD-ROM.

* * * * *